(12) United States Patent
Veelo et al.

(10) Patent No.: US 11,503,854 B2
(45) Date of Patent: Nov. 22, 2022

(54) DEVICE FOR GRINDING AND MIXING OF HERBS AND/OR TOBACCO AND/OR SPICES, PREPARING AND DISPENSING OF CIGARETTES AND METHOD FOR THE APPLICATION THEREOF

(71) Applicant: JROLL TECH LTD., Nicosia (CY)

(72) Inventors: Jaron Veelo, Nicosia (CY); Rohi Hen, Ypsonas (CY)

(73) Assignee: JROLL TECH LTD., Nicosia (CY)

( * ) Notice: Subject to any disclaimer, the term of this patent is extended or adjusted under 35 U.S.C. 154(b) by 117 days.

(21) Appl. No.: 16/762,811

(22) PCT Filed: Nov. 8, 2017

(86) PCT No.: PCT/IB2017/056978
§ 371 (c)(1),
(2) Date: May 8, 2020

(87) PCT Pub. No.: WO2019/092477
PCT Pub. Date: May 16, 2019

(65) Prior Publication Data
US 2020/0345061 A1    Nov. 5, 2020

(51) Int. Cl.
*A24C 5/06*    (2006.01)
*A24B 7/06*    (2006.01)
(Continued)

(52) U.S. Cl.
CPC ............. *A24C 5/06* (2013.01); *A24B 7/06* (2013.01); *A24C 5/322* (2013.01); *A24C 5/3424* (2013.01);
(Continued)

(58) Field of Classification Search
CPC .... A24C 5/02; A24C 5/42; A24B 7/04; A24B 7/00; B02C 18/144; B02C 13/24; B02C 18/08; B02C 18/2216
See application file for complete search history.

(56) References Cited

U.S. PATENT DOCUMENTS 9,427,020 B2    8/2016  Ruzycky
9,895,698 B2    2/2018  Spielman
(Continued)

FOREIGN PATENT DOCUMENTS

WO    WO2017017531    2/2017

*Primary Examiner* — Michael H. Wilson
*Assistant Examiner* — Stephanie Lynn Moore
(74) *Attorney, Agent, or Firm* — Bayramoglu Law Offices LLC (57) ABSTRACT

Device for grinding and mixing of herbs and/or tobacco and/or spices, preparing and dispensing of cigarettes and method for the application thereof The subject of the invention is a device for grinding and mixing of herbs and/or tobacco and/or spices, preparing and dispensing of cigarettes, the device comprising a grinding chamber (2) for holding and grinding the herbs and/or tobacco and/or spices, wherein the grinding chamber (2) has a plurality of tubes (9) for holding pre-rolled cigarette papers (17) and receiving ground herbs and/or tobacco and/or spices, a carousel (10), which is rotatable around a central axis (16). The device further comprises a mixing chamber (5) for mixing the herbs and/or tobacco and/or spices, which is located below the grinding chamber (2), a mixing unit (4) located in the mixing chamber (5), at least one door (7) on the carousel cover (8) for dispensing one tube (9) or a plurality of tubes (9) with the filled pre-rolled cigarette paper (17), wherein the carousel (10) comprises a plurality of tube holders (14) for holding the tubes (9). The subject of the invention is also the method for the application of the device.

20 Claims, 6 Drawing Sheets (51) Int. Cl.
　　　*B02C 18/14*　　　(2006.01)
　　　*B02C 18/24*　　　(2006.01)
　　　*B02C 25/00*　　　(2006.01)
　　　*A24C 5/32*　　　(2006.01)
　　　*A24C 5/34*　　　(2006.01)
　　　*A24C 5/39*　　　(2006.01)

(52) U.S. Cl.
　　　CPC ............ *A24C 5/393* (2013.01); *B02C 18/142* (2013.01); *B02C 18/24* (2013.01); *B02C 25/00* (2013.01)

(56) References Cited

U.S. PATENT DOCUMENTS

| | | | |
|---|---|---|---|
| 2010/0301806 A1 | 12/2010 | Ormaza et al. | |
| 2014/0261471 A1* | 9/2014 | Ruzycky | A47J 42/16 131/108 |
| 2015/0230517 A1* | 8/2015 | Noah | A24C 5/02 131/70 |
| 2016/0106262 A1* | 4/2016 | Mroue | A47J 42/30 241/79 |
| 2016/0120212 A1* | 5/2016 | Heidtmann | A24C 5/02 131/70 |
| 2017/0245541 A1 | 8/2017 | Pagan | |
| 2017/0297033 A1* | 10/2017 | Li | B02C 18/24 |
| 2017/0319009 A1* | 11/2017 | Seckel | B02C 18/2216 |

\* cited by examiner

Detail A

DEVICE FOR GRINDING AND MIXING OF HERBS AND/OR TOBACCO AND/OR SPICES, PREPARING AND DISPENSING OF CIGARETTES AND METHOD FOR THE APPLICATION THEREOF

The subject of the invention is a device for grinding and mixing of herbs and/or tobacco and/or spices, preparing and dispensing of cigarettes. The subject of the invention is also the method for the application of the device.

The state of the art includes the following solutions. South-Korean patent application no. KR101730333 B1 discloses a cigarette manufacturing apparatus including a tobacco leaf supply unit, a cutter unit to cut the tobacco leaves, and a cigarette production unit. The invention is also equipped with a pressurizing rod for pressurizing the supplied tobacco leaves, and a finishing rod for closing the tip of the packed tobacco after pressurization. The disadvantage of the solution is the size of the apparatus and the fact that the apparatus is not portable.

As customers show growing interest in self-made tobacco articles, many patents are disclosing kits and devices for home-made cigarette production. U.S. Pat. No. 6,041,921 A discloses a portable, foldable wallet-like kit for storing smoking apparatus including a storage unit for tobacco and accessories for manually making cigarettes. The invention does not have a grinder unit and the process of making the cigarettes is not automated.

The US patent application no. US2017035105 A1 describes a portable smoking utensil holder and kit. The holder can store and grind the tobacco leaves, and a built-in or a removable lighter is optionally included in the kit. According to the description, additional utensils may be stored within the utensil holder, such as picks or pipe. The device may have audio effects corresponding with the particular action being performed. However the device is not able to fill or roll cigarettes.

The U.S. Pat. No. 9,565,972 B1 discloses a small sized portable grinder for herbs, coffee, tobacco, etc. The grinder can optionally host a storage unit to store the shredded tobacco. The device can be charged through a USB port. The grinder may also be equipped with lighting means. This device also does not offer a solution to properly mix the different ground herbs and fill them in a cigarette.

Another rechargeable electric herb grinder is described in US patent application no. US2010301806 A1. In the housing of the electric grinder several compartments are formed, and the compartments are attachable to each other along a separating joint. The portable device can be charged via a USB port or alternatively, adapters for wall power outlets and car power outlets/cigarette lighters can be utilized to provide the external power. This grinder device also can not mix the ground herbs or fill cigarette cones. A similar device with the same disadvantage is disclosed in the utility model no. CN204032372 U, introducing a portable tobacco grinder having a cylindrical outer shell with storage functions.

An easy-to-use electric tobacco grinding device is disclosed in Chinese utility model no. CN201135126 Y. The transparent cover of the device enables inspection of the grinding process. This tobacco grinder has the same disadvantages not being able to mix the ground herbs and fill the cigarette cones.

The US patent application no. US2016000143 A1 introduces a smoking kit hidden in a toy, namely a bear-shaped figure. The inside of the toy consists of several compartments that can store, preserve, and grind tobacco. The invention is provided with a hollow outer case, the lower part of the mentioned outer case receives and stores the paper roll, tobacco, grinder and cooling tray. This device also lacks functions such as mixing the ground herbs or preparing cigarettes. The Chinese utility model no. CN203194527 U discloses a multi-functional cigarette holder including a tobacco reservoir. The device can optionally include a grinder and it is able to roll cigarettes, but only one cigarette at a time.

The US patent application no. US2015298135 A1 describes a device closest to the present invention. The said US patent discloses a grinding apparatus for tobacco to satisfy the need for hand-made and custom-made tobacco and related products. The device can store the ground tobacco and fill cigarette cones with it. The disadvantage of this invention is that it does not make precise filling possible. Furthermore, another disadvantage is that every step has to be started manually and that the device cannot mix the herbs properly.

Many solutions in the prior art are able to grind various herbs, but cannot mix the herbs properly or fill cigarette cones and roll cigarettes. The devices that have cigarette rolling functions require quite a lot user interaction along the process.

The problem to be solved is to avoid as many user interactions as possible from the process of making cigarettes and create said device. The device to be created is able to store, grind and mix herbs and/or tobacco and/or spices, fill multiple cigarette papers to prepare ready cigarettes, and dispense the cigarettes to the user with a single press of a button.

The purpose of the invention is to eliminate the faults of known solutions and to provide a compact, easy-to-use device for making ready cigarettes from herbs and/or tobacco and/or spices.

The inventive step is based on the recognition that it is advantageous to automate every single step of a hand-made or hand-rolled cigarette including grinding herbs/spices/tobacco, mixing them properly and filling the mixed herbs into pre-rolled cigarette papers placed in tubes and also dispensing the ready cigarettes to the user.

The presented device has numerous advantages. The device reduces user interaction, as it can be operated by a single press of a button, and then the device grinds and mixes the herbs/spices/tobacco, and fills the pre-rolled cigarette papers placed in the tubes and dispenses the ready cigarettes. Instead of a button, the device can be controlled through a user interface of a mobile application or software, which makes the use of the device even more convenient. Controlling the device through wireless connection, for example Bluetooth is also possible. Through such a user interface, the user can also monitor his or her smoking habits. Furthermore, the device can be equipped with safety measures, such as a child lock to prevent children to reach the content of the device, or the device can include a time lock to prevent too frequent use. As such, this aesthetically designed device can be a great help for someone in the way of quitting smoking. The device is chargeable and portable, and also has the advantage of being protected from total dust ingress and water spray from any direction. The device may also comprise a display for displaying all the necessary information such as time, status of power supply, the number of filled tubes, the weight of the herbs/spices/tobacco inside one of the chambers, etc. The tubes are removable for easy storage of the prepared cigarettes for portability.

According to the above purpose, the most general implementation form of the solution according to the invention is described in claim 1. The most general form of the procedure of use is described in claim 10. The individual implementation forms are described in the sub-claims.

The solution in general is a device for grinding and mixing of herbs and/or tobacco and/or spices, preparing and dispensing of cigarettes, the device comprising a grinding chamber for holding and grinding the herbs and/or tobacco and/or spices, wherein the grinding chamber has a top, a plurality of tubes for holding pre-rolled cigarette papers and receiving ground herbs and/or tobacco and/or spices, a carousel, which is rotatable around a central axis and is located within carousel cover, the grinding chamber is equipped with a grinder unit, the grinder unit is connected to a motor, the motor being capable of driving the grinder unit, a tray for delivering the ground herbs and/or tobacco and/or spices into pre-rolled cigarette papers placed in one tube or in plurality of tubes, the tray is located above the carousel, a power supply connected to the motor, said power supply is located in a bottom cover, A feature of the invention is that the device further comprises a mixing chamber for mixing the herbs and/or tobacco and/or spices, which is located below the grinding chamber, a mixing unit located in the mixing chamber and connected to the motor via a drive shaft, at least one door on the carousel cover for dispensing one tube or a plurality of tubes with the filled pre-rolled cigarette paper, wherein the carousel comprises a plurality of tube holders for holding the tubes, the tray is located below the mixing chamber, the carousel cover is mounted on the bottom cover, the mixing chamber is mounted on the carousel cover, the grinding chamber is mounted on the mixing chamber.

In another implementation form, the grinder unit is equipped with at least two grinding gears, the grinder unit and/or the mixing unit is connected to a controlling unit for controlling the operation of the grinder unit and/or the mixing unit; the controlling unit is placed below the motor and/or the controlling unit is a wirelessly connected software or application and/or the controlling unit is a button or connected to a button located on the mixing chamber.

In a different embodiment, the mixing unit comprises a nozzle, the tray comprises at least one cone for accommodating the nozzle.

In another embodiment, the number of tube holders placed in the carousel is between 2-20, preferably ten; the number of tubes is equal or less than the number of tube holders in the carousel. In other embodiments the number of tube holders and tubes can be even more than twenty.

In another possible embodiment, the diameter of the tubes is 5-40 mm, preferably 10-24 mm; the length of the tubes is 5-20 cm, the maximum length preferably being 11 cm; the height of the carousel is equal or more than the length of the tubes. In other embodiments the diameter and the length of the tube can be even more. When preparing cigarettes with less herbs/tobacco/spices in it, it is also possible to use shorter tubes as well. The device makes it possible to prepare shorter and longer cigarettes at the same time, using different sizes of tubes in the carousel at the same time.

In a different embodiment, the top is removably connected to the grinding chamber and/or the top comprises a button. As an example, the top can be connected to the grinding chamber with a hinge.

In another possible embodiment, the grinding chamber and/or the mixing chamber and/or the carousel is equipped with a scale.

In another possible embodiment, the carousel is equipped with a vibrating element and/or a carousel motor, the carousel is driven by the carousel motor.

In another implementation form, the device further comprises a display preferably placed on the bottom cover.

The general application of the invention includes the steps of adding herbs and/or tobacco and/or spices to the grinding chamber, grinding said herbs and/or tobacco and/or spices with the grinder unit, placing pre-rolled cigarette papers into one tube or in plurality of tubes, forwarding the ground herbs and/or tobacco and/or spices to the carousel and filling at least one pre-rolled cigarette paper with the ground herbs and/or tobacco and/or spices. The feature of the general method is that after grinding and before forwarding the ground herbs and/or tobacco and/or spices to the carousel the method further includes the steps of forwarding the ground herbs and/or tobacco and/or spices to the mixing chamber, and then mixing the ground herbs and/or tobacco and/or spices with the mixing unit in the mixing chamber thus creating a mixture, after filling at least one pre-rolled cigarette paper with the mixture, the method further continues with the steps of rotating the carousel around the central axis to move one or more tubes with the filled pre-rolled cigarette papers to at least one door, and then dispensing said one or more tubes with the filled pre-rolled cigarette papers through one or more doors. Filling might mean filling fully or also filling partially. The carousel can rotate with or without the tray.

Another feature of the method may be that it further includes the steps of controlling the operation of the grinder unit and/or the mixing unit with controlling unit, and setting the speed of mixing unit and/or grinder unit with the controlling unit.

Another feature of the method may be that after dispensing one or more tubes with the filled pre-rolled cigarette papers, the method continues with grinding the remaining herbs and/or tobacco and/or spices in the grinding chamber with the grinder unit. The method may further include the step of stopping the grinder unit when the mixing chamber is full.

Another different feature of the method may be that after filling at least one pre-rolled cigarette paper with the mixture, it further includes the step of compressing said mixture in at least one pre-rolled cigarette paper and/or vibrating at least one tube with the vibrating element.

Another possible feature of the method may be that it further includes the step of measuring the weight of the herbs and/or tobacco and/or spices placed in the grinding chamber and/or the weight of the mixture in the mixing chamber and/or the weight of the mixture filled in the pre-rolled cigarette papers.

The invention is presented in more detail by examples of implementation, using drawings.

On the following drawings.

Figure 1:
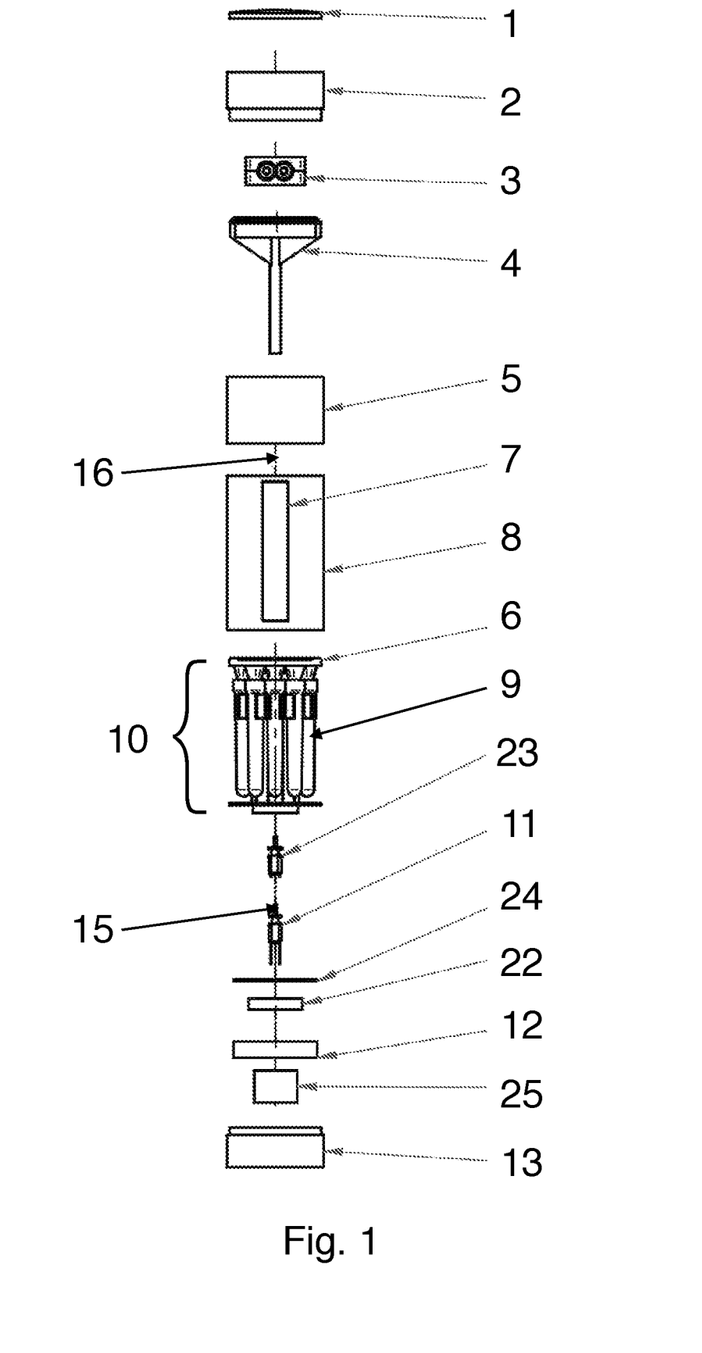
FIG. 1 shows the exploded-view of one embodiment of the device.

FIG. 1 is the exploded-view of one embodiment of the device illustrating all major elements of it. Top 1 is the cover of the grinding chamber 2, which can be filled with e.g. herbs, spices or tobacco. Optionally, between the top 1 and the grinding chamber 2 seals can be used to make the device odor proof, and also to preserve the aromas of the herbs/spices/tobacco (hereinafter herbs). Top 1 may be equipped with a button. On the bottom of the grinding chamber 2 there is a grinder unit 3 located to cut or grind the herbs. Under the grinder unit 3 a mixing unit 4 is located to properly mix the ground herbs. The mixing unit 4 is placed in a mixing chamber 5, where the ground and mixed herbs are stored. Preferably the capacity of the grinding chamber 2 and the mixing chamber 5 is similar. Below the mixing chamber 5 a tray 6 is installed. The tray 6 is designed to have several cones 21. The cones 21 help transferring the ground and mixed herbs to pre-rolled cigarette papers 17 in one tube 9 or into a plurality of tubes 9. The tubes 9 are held by the tube holders 14 located in the carousel 10. The carousel 10 is placed in carousel cover 8. According to this embodiment the carousel cover 8 is equipped with one door 7 where the loaded cigarettes are dispensed. In other embodiments the carousel cover 8 can be equipped with more than one door 7. The door 7 can be made of transparent materials for enabling the user to inspect the filling process. Below the carousel 10 a carousel motor 23 is placed to drive the carousel 10. The carousel motor 23 is powered by a power supply 12 and is able to rotate the carousel 10 around the central axis 16. The device includes another motor 11 for driving and rotating the gears of the grinder unit 3 and the mixing unit 4 through drive shaft 15. The motor 11 is powered by a power supply 12 that can be a battery, a rechargeable battery, etc., and is located below the carousel 10 and the carousel motor 23. Below the motor there is a controlling unit 24, which can be equipped with Bluetooth communication tool thus making wireless controlling possible. The controlling unit 24 controls the operation of the grinder unit 3 and/or the mixing unit 4, but the controlling unit 24 might also be a wirelessly connected software or application and/or a button located on the mixing chamber 5. For easier and more precise filling, the grinding chamber 2 and/or the mixing chamber 5 and/or the carousel 10 can be equipped with a scale 22. In this embodiment the scale 22 is located below the controlling unit 24. The scale is also able to measure the exact amount of herbs used in the process and to be filled into the tubes 9. Sensors may also be applied to make more precise filling possible. On the bottom cover 13 there is a display 25 located for displaying necessary information such as time, status of power supply 12, the number of filled tubes 9, the weight of the herbs/spices/tobacco inside one of the chambers, etc. From the bottom side, the device is closed by a bottom cover 13. The bottom cover 13 covers the motor 11 and the carousel motor 23, the controlling unit 24, the scale 22 and the power supply 12. The top 1, the grinding chamber 2, the mixing chamber 5, the carousel cover 8 and the bottom cover 13 are connected, so these parts are forming the outer shell of the device. The connecting elements can be disconnected from one another for easier maintenance and cleaning, for example by rotating. The connecting elements can be equipped with seals for the device to be odor proof. The device can also be equipped with at least one button to start an action such as grinding or mixing or a series of actions, for example from grinding to filling the tubes with herbs. The device can also include a child lock mechanism for safety reasons. Further embodiments of the device may include indicator lights to show the progress and/or the status of the power supply 12 and/or the amount of the remaining herbs. Display 25 and indicator lights can be used at the same time. Instead of indicator lights, notifications may also be forwarded to the user interface as well through wireless communication.

Figure 2:
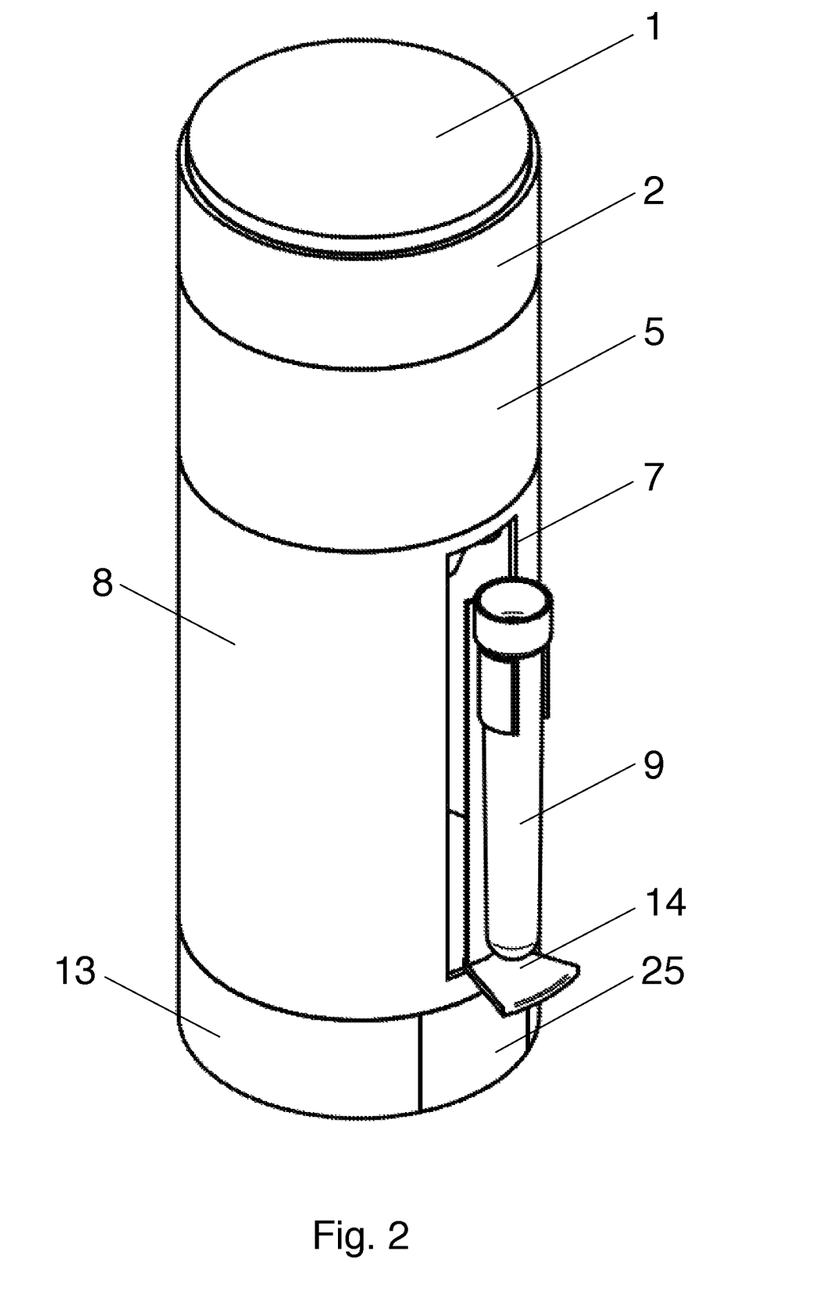
FIG. 2 shows the perspective view of one embodiment.

FIG. 2 shows the perspective view of the embodiment of FIG. 1. The outer shell of the device is formed by the top 1, the grinding chamber 2, the mixing chamber 5, the carousel cover 8 and the bottom cover 13, where each part is connected to the neighboring parts. FIG. 2 illustrates the step when a tube 9 is being dispensed through the door 7 of the carousel cover 8. After the tube 9 is dispensed with the at least partially filled pre-rolled cigarette paper 17 in it, the user can take the cigarette out of the tube 9, or take the whole tube 9 and use the tube 9 as a portable storage of the cigarette. The tube 9 is being held by a tube holder 14. The display 25 is also illustrated on this drawing, the display 25 is on the bottom cover 13 for displaying information to the user.

Figures 3, 4:
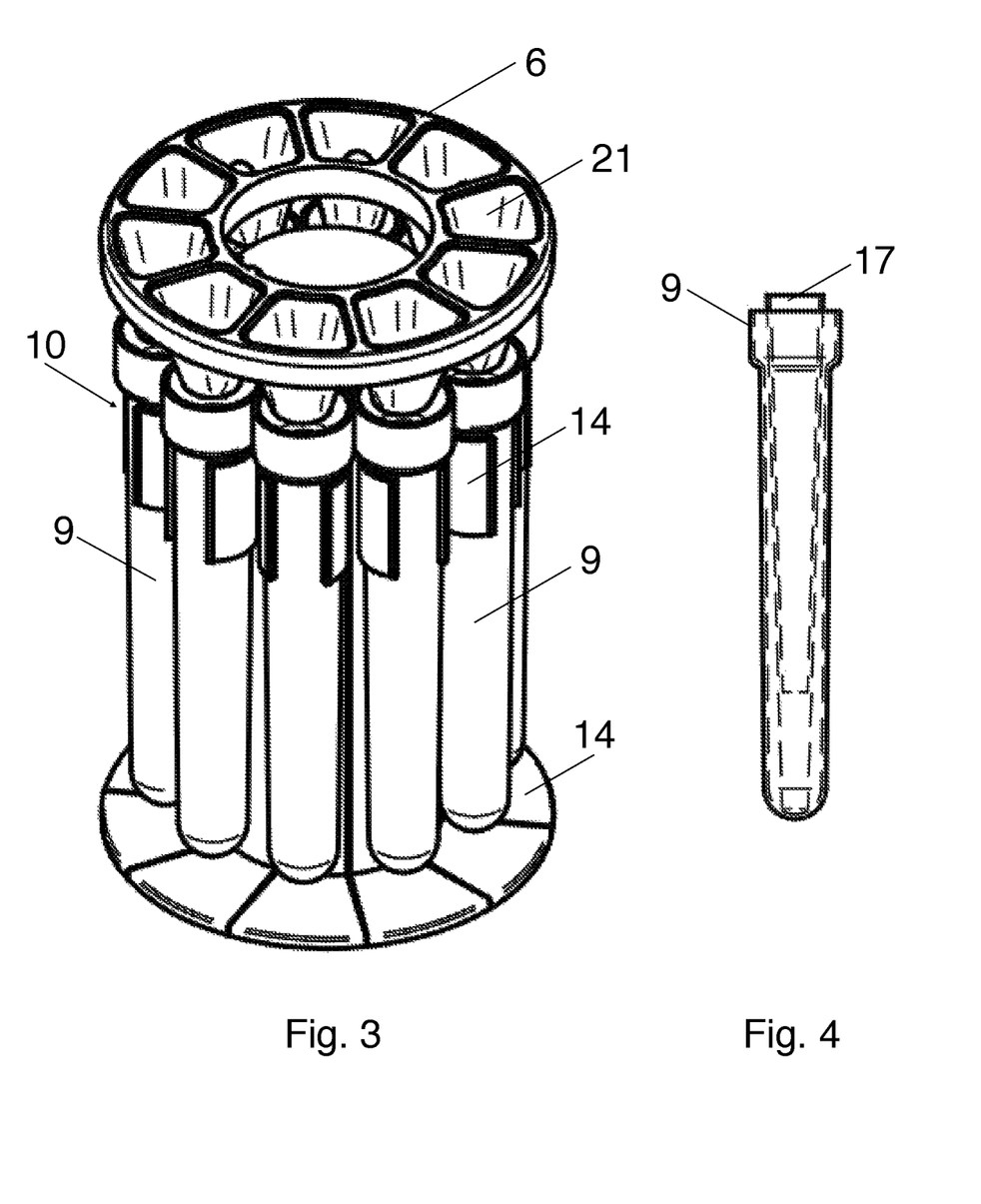
FIG. 3 shows the details of the carousel.
FIG. 4 shows a tube in side-view.

FIG. 3 shows the details of the carousel 10 having ten tubes 9. The carousel 10 has tube holders 14 for holding and moving the tubes 9. One tube holder 14 holds one tube 9. The tube holder 14 can move a tube 9 to the door 7 and then dispense a tube 9 through the door 7 once the pre-rolled cigarette paper 17 placed in the tube 9 is at least partially filled, and optionally shook and/or compressed, and the tube holder 14 moves with the tube 9. The number of tubes 9 being held by tube holders 14 can vary between one and twenty, preferably between two and twenty, but can be even more too. The number of tubes 9 is equal or less than the number of tube holders 14. In the embodiment shown on the drawings there are ten tubes 9 held by ten tube holders 14. Above the tubes 9 there is a ring-shaped tray 6, the tray 6 is placed between the mixing chamber 5 and the carousel 10. The tray 6 comprises at least one cone 21. The embodiment shown on this figure has ten cones 21. The tubes 9 are able to accommodate said cones 21, and the filling process is done through those cones 21. More pre-rolled cigarette papers placed in the tubes 9 may be filled at the same time, but are preferably filled one by one. The tray 6 and the carousel 10 can rotate around central axis 16.

FIG. 4 is the side-view of a tube 9, when a pre-rolled cigarette paper 17 is placed in said tube 9. The pre-rolled cigarette paper 17 may have the shape of a cone or a duct. Placing pre-rolled cigarette paper 17 in the tubes 9 makes it possible to precisely prepare and then dispense a ready cigarette containing any spices, herbs or tobacco in a very short time. The tube 9 may have a cap for closing said tube 9, and the shape of the tube 9 can be cone or a duct. The diameter of the pre-rolled cigarette paper 17 is usually between 5-30 mm, preferably 10-28 mm, but can be even more. The length of the pre-rolled cigarette paper 17 is usually between 84-280 mm, but can also be longer.

Figure 5:
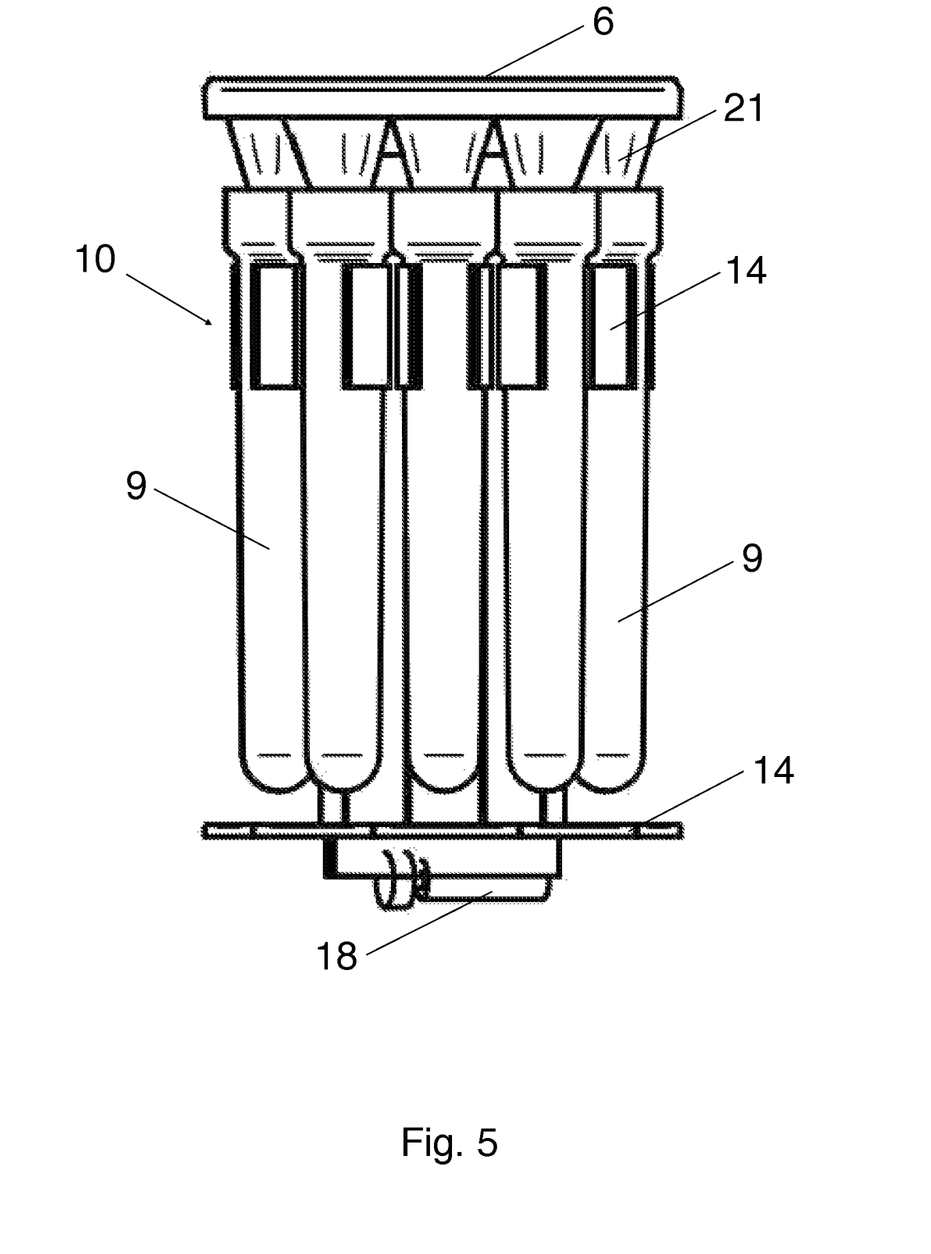
FIG. 5 shows the carousel in side-view.

FIG. 5 shows the carousel 10 in side-view. As seen on the previous figure, the carousel 10 has tube holders 14 for holding the tubes 9. The embodiment shown on this drawing has ten tube holders 14 and ten tubes 9, and furthermore includes a vibrating element 18 located below the carousel 10 for vibrating the tubes 9, thus shaking the herbs/spices/tobacco in the tubes 9. The vibrating element 18 can be driven by the carousel motor 23. Above the carousel 10 one can see the tray 6 having cones 21 for transferring the mixed and ground herbs/spices/tobacco into one or a plurality of pre-rolled cigarette papers 17 placed in the tubes 9. The diameter of the tubes 9 is 5-40 mm, preferably 10-24 mm, but can be even more; the length of the tubes 9 is 5-20 cm, but can be even more, the maximum length preferably being 11 cm. The height of the carousel 10 is equal or more than the length of the tubes 9.

Figure 6:
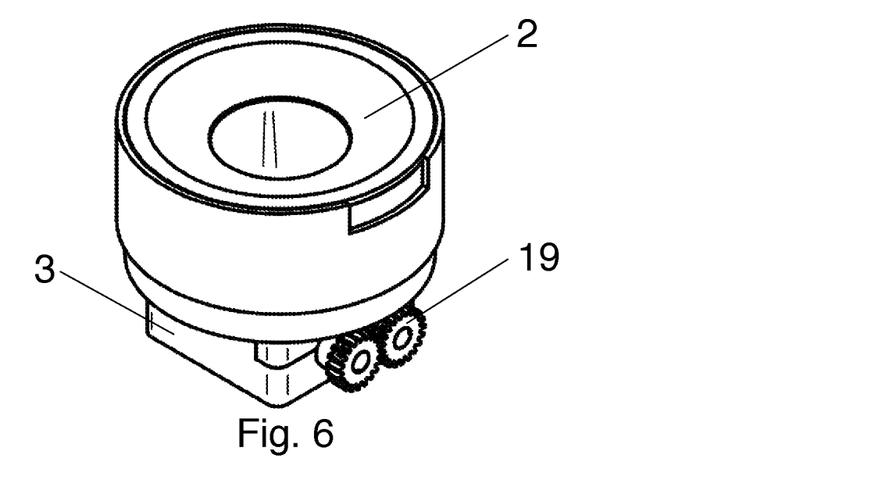
FIG. 6 shows a perspective view of the grinding chamber and the grinder unit.
Figure 7:
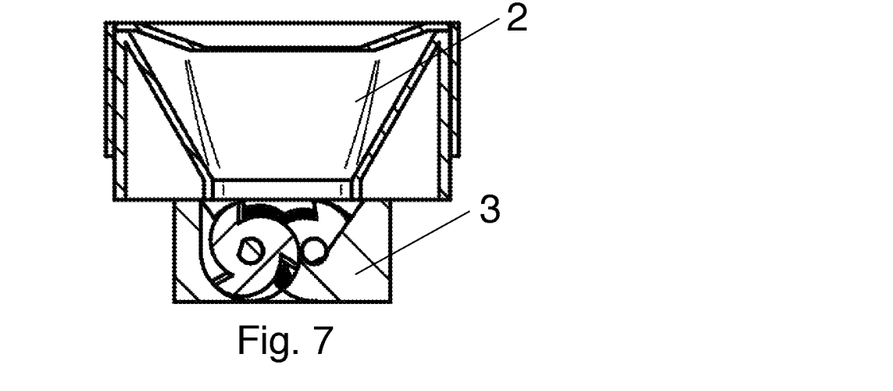
FIG. 7 shows a section drawing of the grinding chamber and the grinder unit.
Figure 8:
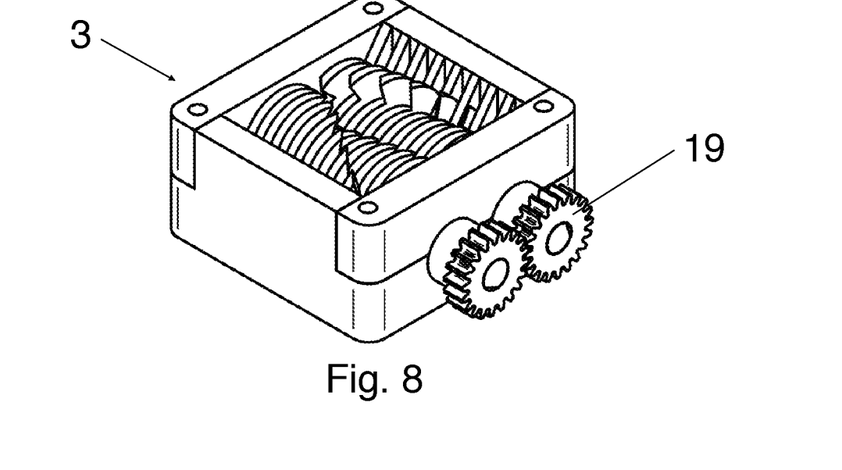
FIG. 8 shows a perspective view of the grinder unit.

FIG. 6 and FIG. 7 show the grinding chamber 2 and the grinder unit 3, while FIG. 8 shows a perspective view of the grinder unit 3. The grinder unit 3 is equipped with at least two gears 19 and has blades or grinding teeth inside. The grinder unit 3 is connected to the motor 11 through the mixing unit 4 and the drive shaft 15 of the motor 11. The grinder unit 3 is located below the grinding chamber 2, said grinding chamber 2 is capable of holding the herbs/spices/tobacco before grinding them. The grinding chamber 2 may have a removable top cover and might be equipped with a button. The herbs/spices/tobacco fall from the grinding chamber 2 to the grinder unit 3 to be ground, and then the ground herbs/spices/tobacco fall to the mixing chamber 5.

Figure 9:
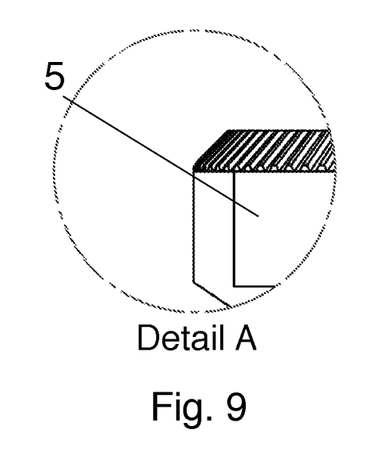
FIG. 9 shows a magnified detail of the mixing unit.

FIG. 9 shows detail A, which is a magnified detail of the mixing unit showing the grinder transmission between the grinder unit 3 and the mixing unit 4. The mixing chamber 5 is also shown on the drawing.

Figure 10:
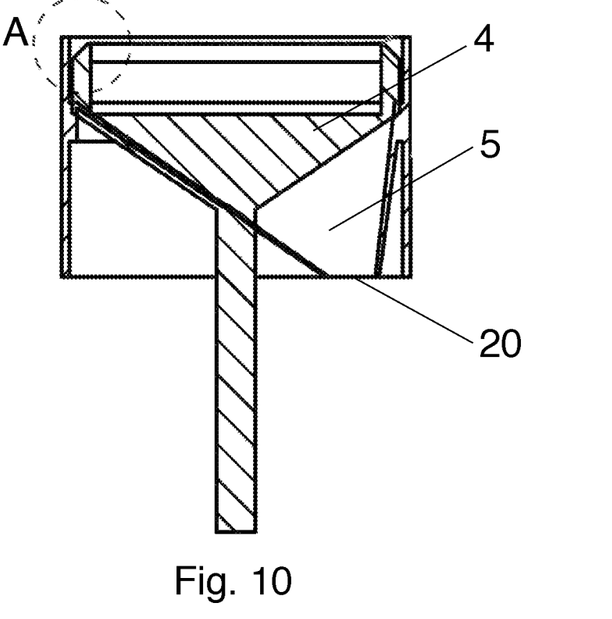
FIG. 10 shows a section drawing of the mixing chamber and the mixing unit.
Figure 11:
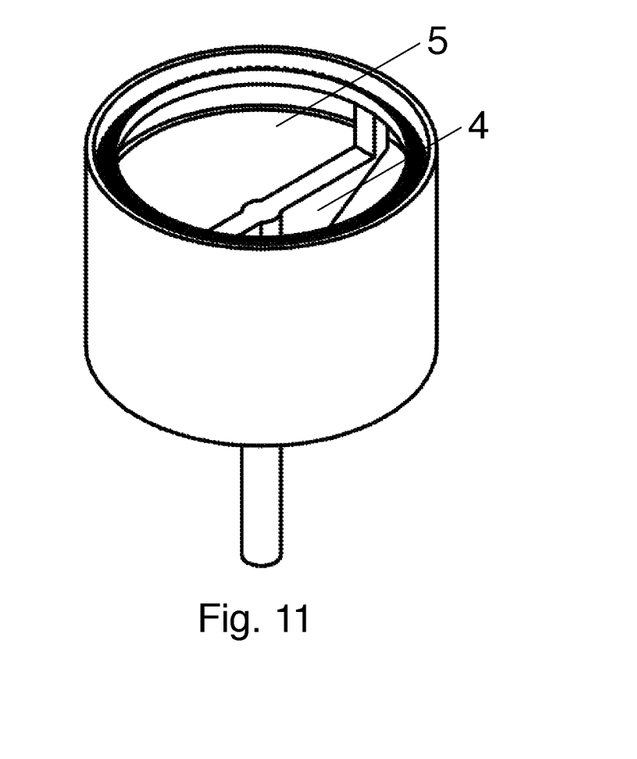
FIG. 11 shows a perspective view of the mixing chamber and the mixing unit.

FIGS. 10 and 11 give a closer look of the mixing chamber 5 and the mixing unit 4. The mixing unit 4 mixes the herbs and/or tobacco and/or spices properly. The mixing chamber 5 is located below the grinding chamber 2, and holds similar amount of herbs/spices/tobacco as loaded above in the grinding chamber 2. In essence, ideally, all herbs/spices/tobacco gets ground at the same time to ensure a perfect proportional mix of the different herbs/spices/tobacco put in grinding chamber 2. However, in case there is more herbs/spices/tobacco in the grinding chamber 2 than the capacity of the mixing chamber 5, it is advisable to be more cautious and add the herbs/spices/tobacco to the mixing chamber 5 in more portions, or, when the mixing chamber 5 is full, stopping the grinding process automatically so that no more herbs/spices/tobacco fall into the mixing chamber 5. Then the grinding process can be started again when the mixing chamber 5 is empty again, or when one or more tubes 9 are already filled. The filling can also mean filling partially. The mixing unit 4 is located in the mixing chamber 5 and is connected to the motor 11 via the drive shaft 15 of said motor 11. The mixing unit 4 comprises a nozzle 20, which can be accommodated by a cone 21 of the tray 6. The filling process is being fulfilled through said nozzle 20. In another embodiment, the mixing chamber 5 could have a transparent window for watching the mixture.

The steps of the method for the application of the device are as follows. Firstly, the user may open the top 1 and fill the grinding chamber 2 with selected herbs such as *cannabis*, and/or tobacco and/or spices. Any combination of those is possible. After closing the top 1, the device grinds the herbs and/or tobacco and/or spices with the grinder unit 3. The grinder unit 3 has grinding teeth or blades for this purpose and is located below the grinding chamber 2. The grinder unit 3 is operated by the motor 11. The grinding can start at a press of a button, or in some embodiments grinding can be initiated through wireless connection for example by software or a mobile application. After grinding the ground herbs and/or tobacco and/or spices fall into the mixing chamber 5, where the mixing unit 4 properly mixes the herbs and/or tobacco and/or spices. When the mixing chamber 5 is full, the grinder unit 3 automatically stops grinding. When the level of the mixed herbs and/or tobacco and/or spices (hereinafter mixture) reduces in the mixing chamber 5, the grinding starts again automatically. The process of mixing can start automatically after grinding or be initiated by separate user interaction, for example by pushing a button, or by closing the grinding chamber 2 with the top 1, or by instructing the mixing unit 4 with the controlling unit 24. The speed of the grinder unit 3 and/or the mixing unit 4 may be set and may be changed with a controlling unit 24. The mixture is stored in the mixing chamber 5, ready to be used for filling. Before performing the next step, which is the filling, it is necessary to place as many pre-rolled cigarette papers 17 into as many tubes 9, as many cigarettes the user would like to prepare. The process of filling the pre-rolled cigarette papers 17 placed in the tubes 9 can be started by user interaction, and the user can indicate the amount of cigarettes or joints to be filled from one to the maximum capacity of the device. In the embodiment of FIG. 1 the maximum capacity at the same time is ten cigarettes. When filling the pre-rolled cigarette papers 17 placed in the tubes 9 it is possible to fill them only partially, for example by halving the amount of herbs and/or tobacco and/or spices. For this reason, the user can also use shorter tubes 9; or additional sensors for sensing when to stop the filling of the pre-rolled cigarette papers 17 in the normal sized tubes 9. The user interaction can be a press of a button or a command through a wireless communication by software or mobile application, or an instruction from the controlling unit. Once the filling process is initiated, the mixture is loaded into one or more pre-rolled cigarette papers 17 placed in the tubes 9. In one embodiment the device can only load one tube 9 at a time, then if more cigarettes have to be filled, the carousel motor 23 rotates the carousel 10, so after one pre-rolled cigarette paper in one tube 9 is filled, an empty tube 9 with an empty pre-rolled cigarette paper 17 inside is rotated below the cone 21 of the tray 6. The rotation continues till the selected amount of tubes 9 is properly and at least partially filled. Depending on the purpose, the tray 6 and the carousel 10 can rotate together or separately. In other embodiments the tray 6 has more cones 21, preferably the amount of cones 21 and tubes 9 are the same, allowing the carousel 10 and the tray 6 rotating together, and thus the selected amount of tubes 9 can be filled simultaneously. After filling, the device ejects the filled tubes 9 with the ready cigarettes inside through the door 7 of the carousel cover 8. If more than one tube 9 was filled, the device dispenses the tubes 9 one-by-one in sequence by rotating the carousel 10. Dispensing another filled tube 9 may also be initiated by pushing a button. The carousel 10 is driven by the carousel motor 23 or the motor 11, which are powered by the power supply 12. Optional steps, like measuring the weight of the herbs and/or tobacco and/or spices placed in the grinding chamber 2 and/or the weight of the mixture in the mixing chamber 5 and/or the weight of the mixture filled in the pre-rolled cigarette papers 17; or compressing the mixture in at least one pre-rolled cigarette paper 17 and/or vibrating at least one tube 9 with the vibrating element 18 is also possible. The method can be started over from grinding automatically. When the grinding chamber 5 becomes empty, the user may add any herbs and/or tobacco and/or spices, and then the process can start again from the beginning. The different steps of the process can be performed and started automatically or by user's interaction as well.

The invention is not restricted to the above-described embodiment. In addition to the above examples, the invention may be implemented within the scope of protection in other forms.

What is claimed is:

1. A device for grinding and mixing of herbs, tobacco, or spices, and for the preparing and dispensing of cigarettes, the device comprising:

a grinding chamber configured for holding and grinding the herbs and/or tobacco and/or spices, wherein the grinding chamber further comprising a top; one or more tubes configured for holding pre-rolled cigarette papers and receiving ground herbs, tobacco, or spices, a carousel, which is rotatable around a central axis and is located within a carousel cover;

the grinding chamber being further equipped with a grinder unit, wherein said grinder unit is connected to a motor, the motor being capable of driving the grinder unit;

a tray configured for delivering the ground herbs, tobacco, or spices into pre-rolled cigarette papers placed in one or more tubes;

a power supply connected to the motor, said power supply being located in a bottom cover, wherein the carousel cover is mounted above the bottom cover;

a mixing chamber for mixing the herbs, tobacco, or spices, said mixing chamber located below the grinding chamber;

a mixing unit located in the mixing chamber and connected to the motor via a drive shaft;

at least one door on the carousel cover for dispensing the one or more tubes holding the pre-rolled cigarette paper;

wherein the carousel further comprises a plurality of tube holders each configured to hold one or more tubes;

the tray is located below the mixing chamber and the mixing chamber is mounted on the carousel cover;

the grinding chamber is mounted on the mixing chamber; and wherein each of the one or more tubes are individually separable from the carousel.

2. The device according to claim 1, wherein the grinder unit is further equipped with at least two grinding gears; and the device further comprises a controlling unit for controlling the operation of at least one of the grinder unit and the mixing unit.

3. The device according to claim 1, wherein the mixing unit further comprises a nozzle; and the tray further comprises at least one cone for accommodating the nozzle.

4. The device according to claim 1, wherein the plurality of tube holders placed in the carousel numbers from two to twenty; and the number of tubes is equal or less than the number of tube holders in the carousel.

5. The device according to claim 1, wherein the diameter of each tubes of the plurality of tubes is from five to forty millimeters; the length of each of the plurality of tubes is from five to twenty centimeters; the height of the carousel is equal or more than the length of any of the plurality of tubes.

6. The device according to claim 1, wherein the top is removably connected to the grinding chamber.

7. The device according to claim 1, wherein the top comprises a button.

8. The device according to claim 1, wherein the device further comprises a scale, said scale being operatively connected to at least one of the grinding chamber, mixing chamber, or the carousel.

9. The device according to claim 1, wherein the carousel further comprises a vibrating element.

10. The device according to claim 1, wherein the device further comprises a carousel motor and the carousel is driven by said carousel motor.

11. The device according to claim 1, wherein the device further comprises a display.

12. The device according claim 1, wherein the plurality of tubes are removable for portability of the cigarettes; and one or more of the plurality of tubes further comprise a cap configured to close said tube.

13. A method for the application of the device of claim 1, comprising the steps of: introducing the herbs, tobacco, or spices to the grinding chamber; grinding said herbs, tobacco, or spices by use of the grinder unit; forwarding the ground herbs, tobacco, or spices to the mixing chamber;

a mixture is stored in the mixing chamber, ready to be used for filling; mixing the ground herbs, tobacco, or spices by use of the mixing unit in the mixing chamber; placing one pre-rolled cigarette paper into at least one of the plurality of tubes; forwarding the ground herbs, tobacco, or spices to the carousel, filling at least one pre-rolled cigarette paper with the ground herbs, tobacco, or spices;

rotating the carousel around the central axis to move said tube containing the filled pre-rolled cigarette paper to one of the at least one doors; and dispensing the tubes containing the filled pre-rolled cigarette paper through said one of the one or more doors.

14. The method according to claim 13, further comprises the steps of:

stopping the grinder unit when the mixing chamber is full; controlling the operation of the grinder unit and the mixing unit by use of a controlling unit; and setting the speed of the mixing unit and the grinder unit by use of the controlling unit, wherein the controlling unit is operated through a wireless connection.

15. The method according to claim 13, wherein after the step of dispensing one or more tubes with the filled pre-rolled cigarette papers, the method further comprises the step of grinding any remaining herbs, tobacco, or spices in the grinding chamber with the grinder unit.

16. The method according to claim 13, wherein after the step of filling at least one pre-rolled cigarette paper with the ground herbs, tobacco, or spices, the method further comprises the step of compressing said ground herbs, tobacco, or spices in the at least one pre-rolled cigarette paper.

17. The method according to claim 13, comprises the step of vibrating at least one of the plurality of tubes by use of a vibrating element.

18. The method according to claim 13, comprises the step of measuring the weight of the herbs, tobacco, or spices by use of a scale within at least one of the grinding chamber, mixing chamber, or the carousel.

19. A device for grinding and mixing of herbs, tobacco, or spices, and for preparing and dispensing of cigarettes, the device comprising:

a grinding chamber configured for holding and grinding the herbs and/or tobacco and/or spices, wherein the grinding chamber further comprising a top; one or more tubes configured for holding pre-rolled cigarette papers and receiving ground herbs, tobacco, or spices, a carousel, which is rotatable around a central axis and is located within a carousel cover;

the grinding chamber being further equipped with a grinder unit, wherein said grinder unit is connected to a motor, the motor being capable of driving the grinder unit;

a tray configured for delivering the ground herbs, tobacco, or spices into pre-rolled cigarette papers placed in one or more tubes;

a power supply connected to the motor, said power supply being located in a bottom cover, wherein the carousel cover is mounted above the bottom cover;

a mixing chamber for mixing the herbs, tobacco, or spices, said mixing chamber located below the grinding chamber;

a mixing unit located in the mixing chamber and connected to the motor via a drive shaft;
at least one door on the carousel cover for dispensing the one or more tubes holding the pre-rolled cigarette paper;
wherein the carousel further comprises a plurality of tube holders each configured to hold one or more tubes;
the tray is located below the mixing chamber and the mixing chamber is mounted on the carousel cover;
the grinding chamber is mounted on the mixing chamber;
wherein each of the one or more tubes are individually separable from the carousel;
wherein the grinder unit is further equipped with at least two grinding gears; and the device further comprises a controlling unit for controlling the operation of at least one of the grinder unit and the mixing unit; and
wherein the motor is configured to rotate the mixing unit via the drive shaft and the mixing unit includes transmission teeth which are configured to drive the at least two gears on the grinding unit when the mixing unit rotates.

20. The device according to claim 1, wherein the plurality of tube holders move the one or more tubes to the at least one door and dispense the one or more tubes through the at least one door once the pre-rolled cigarette paper placed in the one or more tubes is at least partially filled, and shook and/or compressed, and the plurality of tube holders move with the one or more tubes.

* * * * *